UNITED STATES PATENT OFFICE.

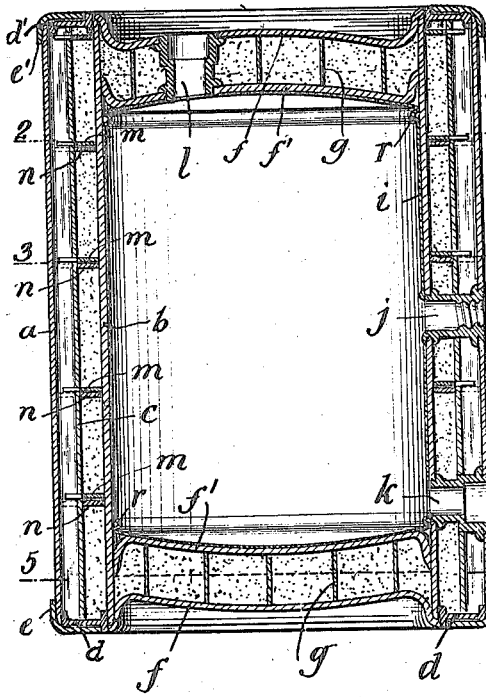
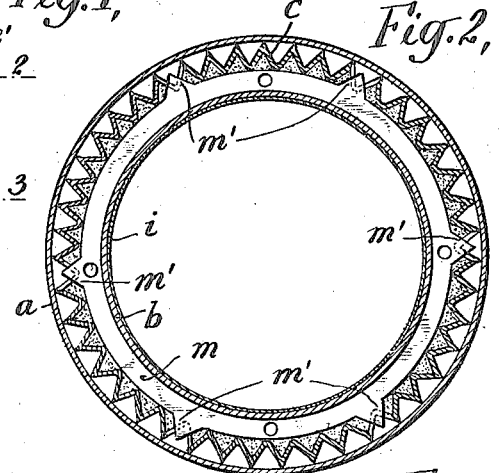
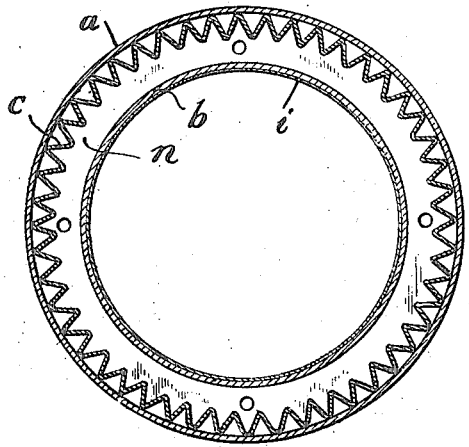
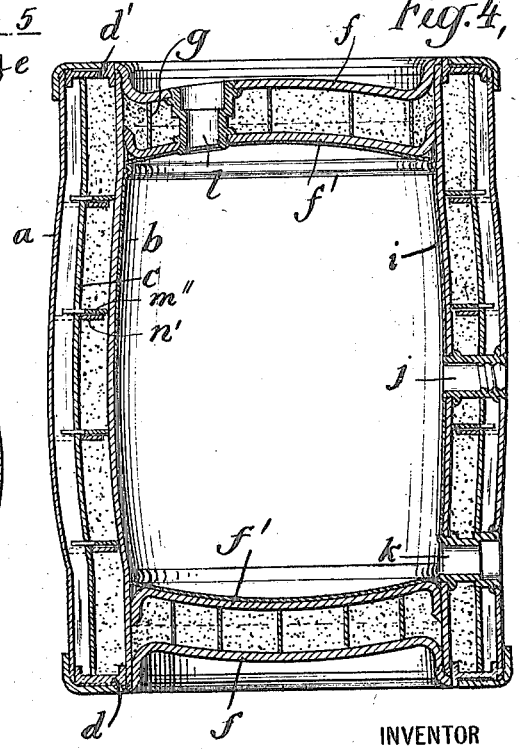

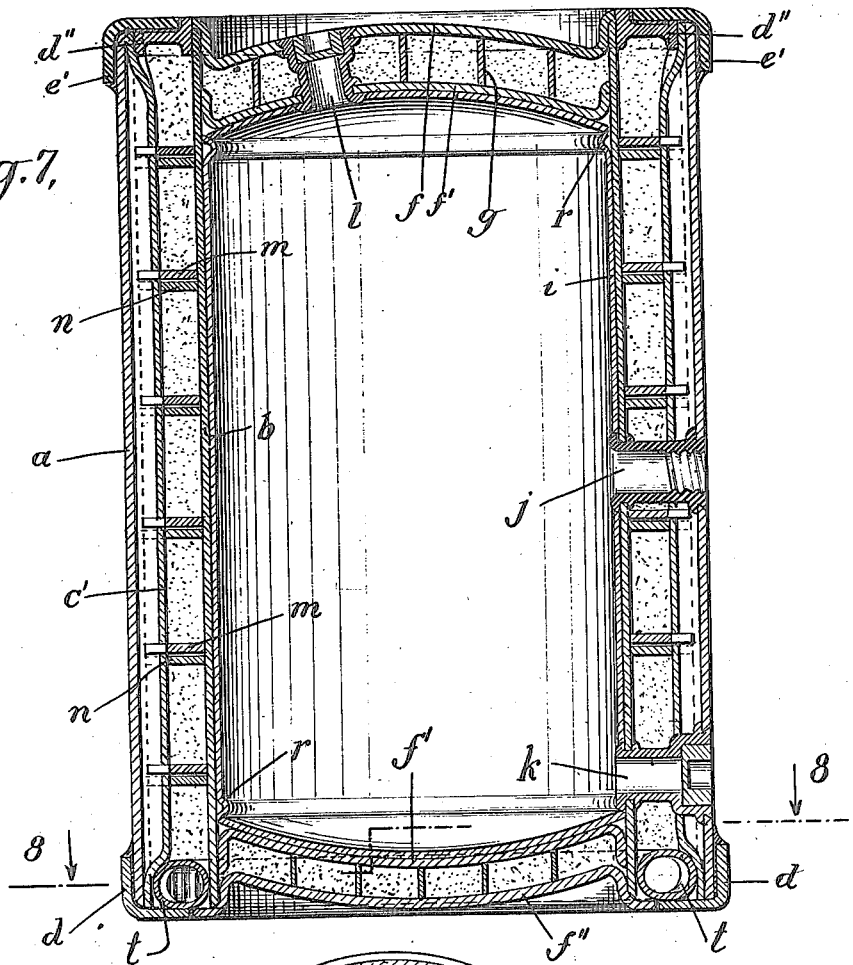
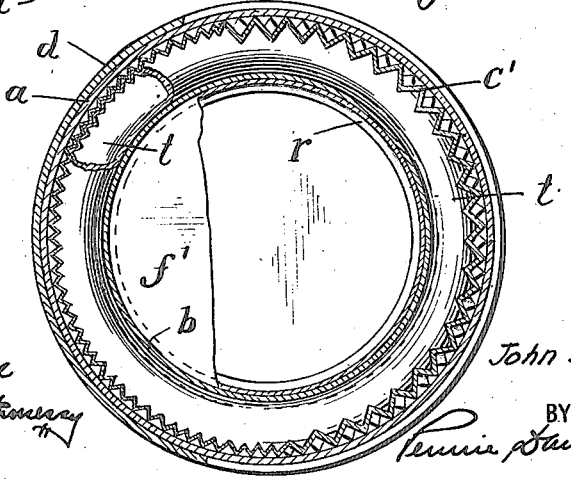

JOHN JACOB WOLF, OF PHILADELPHIA, PENNSYLVANIA.

METAL CASK.

1,180,812.  Specification of Letters Patent.  Patented Apr. 25, 1916.

Application filed July 15, 1912. Serial No. 709,523.

*To all whom it may concern:*

Be it known that I, JOHN JACOB WOLF, a citizen of the United States, and resident of Philadelphia, county of Philadelphia, State of Pennsylvania, have invented certain new and useful Improvements in Metal Casks; and I do hereby declare the following to be a full, clear, and exact description of the invention, such as will enable others skilled in the art to which it appertains to make and use the same.

My invention relates to certain new and useful improvements in metal casks and constitutes a modification of or an improvement upon the construction shown in United States Letters Patent No. 964,080, granted to me on July 12, 1910.

The cask is primarily intended for transporting beer, ale and other liquids, which are subjected to changes of temperature, and the invention has for its object to provide a cask which is of sufficiently strong and durable structure to withstand the wear and tear of transportation and which will by reason of its insulating features, maintain the low temperature of the beer, ale or the like, substantially unaltered, until it reaches the customer. To this end I construct the cask of an inner cylinder, an outer cylinder and a corrugated reinforcing cylinder which lies in contact with the outer cylinder so as to stiffen it both laterally and circumferentially, and which is spaced well apart from the inner cylinder so as to afford a heat insulating space across which the heat conduction through the metal is interrupted. This heat insulating space is preferably filled with heat insulating material, and for the purpose of increasing the strength of the cask as a whole it is advisable to interpose in the heat insulating space annular stiffening rings which contact with the inner cylinder and the corrugated reinforcing cylinder.

Other constructional features of importance in the practical carrying out of my invention will be understood from the following disclosure of specific embodiments thereof.

Figure 6:
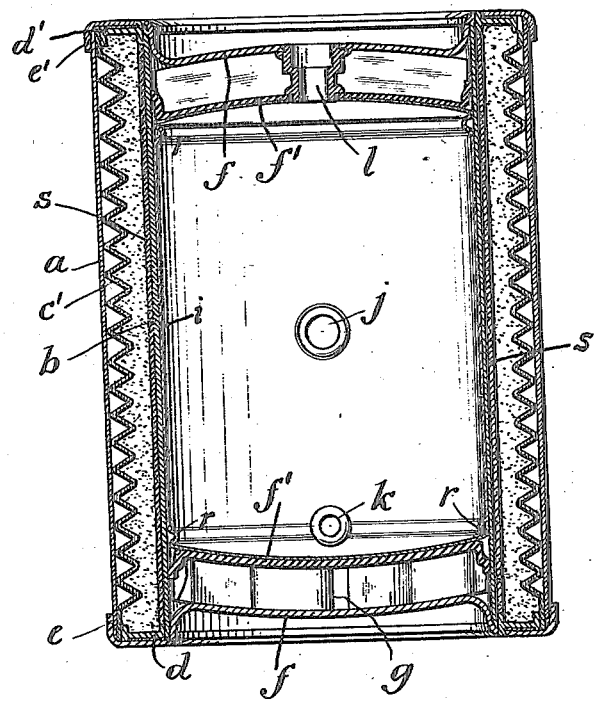
Figure 5:
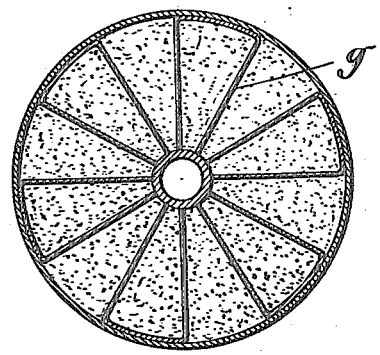

In the accompanying drawings illustrating several modifications within my invention, Figure 1 represents a longitudinal section of one form of cylindrical cask; Fig. 2 represents a section on line 2—2 of Fig. 1; Fig. 3 represents a section on line 3—3 of Fig. 1; Fig. 4 represents a longitudinal section of a cask having a central bilge; Fig. 5 represents a section on line 5—5 of Fig. 1, of a head portion of the cask; Fig. 6 represents a longitudinal section of another form of cask embodying my improvements; Fig. 7 represents a longitudinal section of another form of cask embodying my improvements; and Fig. 8 represents a section on line 8—8 of Fig. 7, on a reduced scale.

Referring particularly to the modification shown in Fig. 1, the main body portion of the cask is made up of an inner cylinder $b$, an outer cylinder $a$ and a corrugated reinforcing cylinder $c$ lying in contact with the outer cylinder $a$ to strengthen and stiffen it, but spaced well away from the inner cylinder $b$, as shown in the drawings, so as to interrupt the heat conductivity through the metal from the inner to the outer cylinder, and afford an effective insulating space. All three cylinders are of sheet metal and preferably wrought iron or steel. At each end of the main body-portion constituted by the three cylinders, is located an end ring $d$, $d'$, forming end closures for the cylinders, and to which, in the construction here shown, the cylinders are welded or brazed so as to be entirely devoid of open joints thereat. There are provided tread rings $e$, $e'$ upon which the cask may be rolled.

Either head portion of the cask comprises two dished and flanged disks $f$, $f'$, of metal, with an intermediate strengthening frame, made up, as shown more fully in Fig. 5, of the bent metal plates $g$ which are inserted on edge between the disks $f$ and $f'$. The bent plates of metal $g$ are preferably of iron and are welded together at their centers so as to form an integral structure. The head portions rest snugly upon the ledge or beading $r$, and are brazed, or otherwise fixed thereto in such manner as to avoid sharp corners and as to make a tight seamless joint. The outer flanges of the dished disks $f$, $f'$ are welded (preferably autogenously) to the inner walls of the cylinder $b$. The interior periphery of the cask may be protected against attack of the beer, ale or other contents of the cask, either by pitching or enameling the surface or by first rolling upon the metal a thin lining $i$ of some acid-resisting metal such as aluminum, Monell metal, or the like, this material being autogenously welded and of such a character as not to injuriously affect the beer or other contents of the cask.

The periphery of the cask is provided with a bung-hole bushing $j$ which may be interiorly screw-threaded as shown, and which is adapted to be secured in place by upsetting its inner and outer edges upon the corresponding cylinders $a$ and $b$, in manner similar to the way in which a boiler tube is lapped to a boiler head. The cask is likewise provided with a faucet-bung bushing $k$ and with a vent-bung bushing $l$ similarly adapted to be united to the parts which they penetrate, as shown.

The space between the disks $f$ and $f'$ is adapted to be filled with granulated cork, or other material suitable for maintaining the low temperature of the beer or other liquid for quite some time without undesirable change. So also, is the insulating space between the cylinders $a$ and $b$ to be filled with insulating material. To this end, the granulated cork, or the like, is filled in before the head ring $d'$ is applied. As the insulating material is filled in to the proper depth, the rings $n$ and $m$ are dropped down through the space between the cylinders $a$ and $b$ and are pressed down upon the insulation below them, thereby strongly compressing it. The uppermost ring $m$ of each pair is provided with a number of outwardly extending tangs or projections $m'$ (as shown more fully in Fig. 2) and the corrugated cylinder is provided with cut away portions or slots corresponding to these projections; so that by rotating the ring $m$ slightly after it has been pressed down, the tangs or projections $m'$ engage these slots and hold the ring $m$ (and consequently the ring $n$) in place. The outer edge of the rings $n$ is serrated and adapted to fit into the corrugation of the cylinder $c$ and it fits snugly around the inner cylinder $b$, at the same time forcing the corrugated cylinder $c$ against the outer cylinder $a$ in such manner as to reinforce both cylinders against pressure and rough handling. After the first pair of rings is inserted, the cork or like material is filled in upon them and a second set of rings is applied in like manner, and so on, with intervening bodies of insulation until the entire space between the cylinders $a$ and $b$ is filled to the top. It will thus be seen that the stiffening rings not only reinforce the inner cylinder and the corrugated stiffening cylinder $c$, thereby increasing the strength of the cask as a whole, but they also serve to maintain the sectional compression of the insulating material; and at the same time the heat conductivity through these rings is so slight that it does not materially lessen the heat insulating proporties of the construction.

The bushings $j$ and $k$ are each fastened in place before any of the rings have been positioned, the lowermost pair of rings being cut away to provide for the reception of the bushing $k$, while the pair just above is split across, so that they can be forced below the bushing $j$. Finally, the head ring $d'$ is put in place and welded to the cylinders, while the tread rings $e$, $e'$ are fixed in place, thus completing the cask.

The modification illustrated in Fig. 4 is of the bilge form having its cylinders outwardly bowed in their central portions, so that the barrel rolls along the bilge. The upper ring $m''$ of each pair fits closely around the inner cylinder $b$ but does not extend to the corrugated cylinder $c$ except at the place of the tangs $m'$ which lock in slots in the corrugated cylinder as do the tangs in Fig. 2. The lower ring $n'$ of each pair fits closely within the corrugated cylinder $c$ but does not extend to the inner cylinder $b$. By this construction, the corrugated cylinder $c$ is reinforced toward the outside by the rings $n'$ and the inner cylinder $b$ is strengthened against internal pressure by the rings $m''$, while the barrel is protected against shock and pressure in transportation as a result of the arched form of the cylinders. The procedure in constructing this form of barrel is similar to that for Fig. 1 except that the insulating material between the cylinder is filled in from both ends and the rings $m''$, $n'$ are inserted from both ends toward the central part.

Fig. 6 shows another modification within my invention wherein the corrugations of the cylinder $c'$ are arranged horizontally instead of vertically and wherein the reinforcing rings are omitted. The inner cylinder is surrounded on the outside with sheet asbestos $s$ or the like for protecting the insulating material between the cylinders $a$ and $b$ when the barrel is pitched or otherwise heated. In this modification, the corrugated cylinder $c$ alone is designed to reinforce the barrel against shock from the outside, while the insulating material serves to maintain the temperature of the liquid within. The bung bushings $j$ and $k$ are fixed in place before the cork or other material is packed between the cylinders. The inside of the barrel may be tinned or plated with aluminum, or it may be pitched, if desired. The end closures $d$, $d'$ are constructed as shown in Fig. 5 and the tread rings $e$, $e'$ on which the barrel rolls, are provided as in Fig. 1.

The modification shown in Figs. 7 and 8 is similar to the construction of Fig. 1, except that the intermediate corrugated cylinder $c'$ is bent outwardly at the top to extend between the end ring $d''$ and the outer cylinder $a$, while the lower portion is bent outwardly to accommodate the strengthening pipe $t$, the end ring $d$ of Fig. 1 being omitted and the disk $f''$ of the lower head portion extending beyond the inner cylinder $b$ as shown. The outer periphery of pipe $t$ is serrated so as to fit the smaller corrugations at the end of the corrugated cylinder $c'$, and is fixed in position before the thread ring $e'$ and the lower head portion are attached. Also the end ring $d''$ has its outer face serrated to fit the smaller corrugations of the cylinder $c'$ at this place. By these means the ends of the cask are further strengthened.

Having thus described my invention, what I claim is:

1. A metal cask for transporting and storing beer, ale and other liquids, comprising an inner cylinder embracing a liquid-holding space and heat-insulating heads, in combination with a strong outer cylindrical casing inclosing the inner cylinder and held in spaced relation with respect thereto by end closures affixed to said cylinders, the outer wall of the cylindrical casing being made up of relatively light sheet-metal reinforced by a corrugated sheet-metal cylinder in immediate contact with the outer wall but spaced apart from the inner liquid-holding cylinder to afford a heat-insulating space therebetween; substantially as described.

2. In a metal cask for transporting and storing beer, ale and other liquids, a heat insulating body portion made up of an inner cylinder, an outer cylinder and a corrugated reinforcing cylinder lying in contact with the inner surface of the outer cylinder to stiffen it longitudinally and circumferentially and spaced well apart from the inner cylinder to afford a heat insulating space therebetween, annular stiffening rings interposed in the heat insulating space and contacting with the inner cylinder and the corrugated cylinder to reinforce said cylinders and strengthen the cask as a whole, and end closures for the cask; substantially as described.

3. In a metal cask for transporting and storing beer, ale and other liquids, a heat insulating body portion made up of an inner cylinder, an outer cylinder and a corrugated reinforcing cylinder lying in contact with the inner surface of the outer cylinder to stiffen it longitudinally and circumferentially and spaced well apart from the inner cylinder to afford a heat insulating space therebetween, a filling of heat insulating material in said space, and annular stiffening rings embedded in said heat insulating material and contacting with the inner cylinder and the corrugated cylinder to reinforce said cylinders and strengthen the cask as a whole.

4. In a metal cask for transporting and storing beer, ale and other liquids, a heat insulating body portion made up of an inner cylinder, an intermediate cylinder, a corrugated reinforcing cylinder lying in contact with the inner surface of the outer cylinder to stiffen it longitudinally and circumferentially and spaced well apart from the inner cylinder to afford a heat insulating space therebetween, a filling of heat insulating material compressed in said space, annular stiffening rings embedded in the heat insulating material and contacting with the inner cylinder and the corrugated cylinder to reinforce said cylinders and strengthen said cask as a whole, the said rings being fastened in place to maintain sectional compression of the insulating material, and end closures for the cask; substantially as described.

5. In a metal cask for transporting and storing beer, ale and other liquids, an inner cylinder, an outer cylinder, an intermediate corrugated cylinder of metal, end closures for the cask, insulating material between the inner and intermediate cylinders, and a series of pairs of rings between the cylinders spaced to reinforce the cask laterally, one ring of each pair being provided with projections arranged to engage slots in the corrugated cylinder; substantially as described.

6. In a metal cask for transporting and storing beer, ale and other liquids, an inner cylinder, an outer cylinder, an intermediate corrugated cylinder of metal, end closures for the cask, insulating material between the inner and intermediate cylinders, and a series of spaced pairs of rings between the cylinders, one ring of each pair fitting against the inner cylinder to reinforce it against internal pressure, and the other ring of each pair holding the corrugated cylinder against the outer cylinder to reinforce the cask from the outside; substantially as described.

7. In a metal cask for transporting and storing beer, ale and other liquids, a body portion, a closure at each end of the body portion made up of disks having an intermediate filling of insulating material and held apart by a strengthening frame of bent sheets of metal set on edge and welded together at the inner meeting ends; substantially as described.

8. In a metal cask for transporting and storing beer, ale and other liquids, a heat insulating body portion made up of inner intermediate and outer cylinders with strengthening rings between the inner and intermediate cylinders to strengthen the cask laterally, flanged end rings fastened at the ends of the body portion to close the space between the inner and outer cylinders, a heat insulating head portion at each end of the cask, and a tread ring at each end of the cask extending around the outside surface of the outer cylinder and over the end ring into contact with the flange of the end ring; substantially as described.

9. In a metal cask for transporting and storing beer, ale and other liquids, a heat insulating body portion made up of inner, intermediate and outer cylinders with strengthening rings between the inner and intermediate cylinders to strengthen the cask laterally, flanged end rings fastened at the ends of the body portion to close the space between the inner and outer cylinders, a heat insulating head portion at each end of the cask, and a tread ring at each end of the cask extending around the outside surface of the outer cylinder and over the end ring into contact with the flange of the end ring, the end rings being welded to the inner and outer cylinders, and the tread rings being welded in place; substantially as described.

10. In a metal cask for transporting and storing beer, ale and other liquids, an inner cylinder having a ledge on its inside surface near each end thereof, an outer cylinder, an intermediate corrugated cylinder, head portions abutting the respective ledges, a lining of material which is neutral to the liquid and which covers the inside of the inner cylinder and the head portions, insulating material between the inner and intermediate cylinders, and end rings for completing the closure of the cask; substantially as described.

In testimony whereof I affix my signature in presence of two witnesses.

JOHN JACOB WOLF.

Witnesses:
JOHN A. ZOELLS,
ANNA E. ZOELLS.